United States Patent [19]
Yasumoto et al.

[11] Patent Number: 5,702,838
[45] Date of Patent: Dec. 30, 1997

[54] FUEL CELL DEVICE EQUIPPED WITH CATALYST MATERIAL FOR REMOVING CARBON MONOXIDE AND METHOD FOR REMOVING CARBON MONOXIDE

[75] Inventors: Eiichi Yasumoto, Katano; Kazuhito Hatoh, Daitou; Takaharu Gamou, Fujiidera, all of Japan

[73] Assignee: Matsushita Electric Industrial Co., Ltd., Osaka-fu, Japan

[21] Appl. No.: 692,963

[22] Filed: Aug. 7, 1996

[30] Foreign Application Priority Data

Aug. 18, 1995 [JP] Japan .................. 7-210821
Sep. 29, 1995 [JP] Japan .................. 7-253954
Mar. 26, 1996 [JP] Japan .................. 8-070498

[51] Int. Cl.$^6$ ............................... H01M 4/90
[52] U.S. Cl. ........................................ 429/40
[58] Field of Search ............... 429/13, 17, 40, 429/41; 423/224, 237, 239.2; 502/78, 79, 344, 74

[56] References Cited

U.S. PATENT DOCUMENTS 5,251,793 10/1993 Bolen, Jr. et al. .
5,447,701 9/1995 Inoue et al. .
5,489,327 2/1996 Otsuka et al. .

FOREIGN PATENT DOCUMENTS 61-018431 A 1/1986 Japan .
05186716 A 7/1993 Japan .

Primary Examiner—M. Nuzzolillo
Attorney, Agent, or Firm—Panitch Schwarze Jacobs & Nadel, P.C.

[57] ABSTRACT

There are disclosed a catalyst material for removing carbon monoxide and a polymer electrolyte fuel cell device using the same catalyst material. This catalyst material comprises an A type zeolite carrying at least one metal selected from the group consisting of Pt, Pd, Ru, Au, Rh and Ir, or an alloy of two or more metals. The catalyst material is capable of removing carbon monoxide in a reformed gas which is fed to the fuel cell by oxidation at a low temperature with good selectivity.

6 Claims, 8 Drawing Sheets

FUEL CELL DEVICE EQUIPPED WITH CATALYST MATERIAL FOR REMOVING CARBON MONOXIDE AND METHOD FOR REMOVING CARBON MONOXIDE

BACKGROUND OF THE INVENTION

1. Field of the Invention

The present invention relates to a catalyst material for removing carbon monoxide (CO), particularly a trace amount of CO present in a reformed gas which deactivates a fuel electrode of a fuel cell, a fuel cell device having the catalyst material equipped in a hydrogen fuel feeding path, and a process of removing CO in the reformed gas fed to the fuel cell.

2. Description of the Prior Art

As a fuel for polymer electrolyte fuel cell (hereinafter referred to as "PEFC"), there can be used a reformed gas prepared by steam-reforming a hydrocarbon material, normally methanol. However, a platinum catalyst is normally used as a fuel electrode of PEFC. This causes a problem that this platinum catalyst is deactivated by a trace amount of CO contained in the reformed gas, thereby drastically deteriorating cell performance.

A process of removing CO in the reformed gas is to separate hydrogen using a Pd thin film, etc. This process comprises application of a constant pressure to one side of a hydrogen separating film to effect selective permeation of hydrogen. In this process, only purified hydrogen is obtained because a gas other than hydrogen does not permeate; the resultant purified hydrogen can be used as a fuel of PEFC. This process has been applied practically in a plant for producing semiconductors, and its application to the production of the fuel for PEFC has also been under development locally.

A process of reducing the concentration of CO contained in the reformed gas includes CO conversion. In this process, a reformed gas prepared by steam-reforming methanol is subjected to CO shift reaction ($CO+H_2O \rightarrow CO_2+H_2$) using a catalyst for CO conversion, thereby to reduce the concentration of CO in the reformed gas to 0.4 to 1.5%. If the concentration of CO can be reduced to this level, the reformed gas can be used as the fuel for a phosphoric acid type fuel cell (hereinafter referred to as "PAFC") using the same Pt electrode catalyst. However, in order to prevent deactivation of the platinum catalyst of the fuel electrode of PEFC, the concentration of CO must be reduced to the level of several tens ppm at most because an operating temperature (50° to 100° C.) of PEFC is lower than that (about 170° C.) of PAFC. CO conversion process alone can not give a gas that can be applied as the fuel gas for PAFC.

Another process has been developed wherein oxygen is introduced into the CO-conversion gas to oxidize CO with an oxidation catalyst at 200° to 300° C., thereby to remove CO. The use of an alumina catalyst carrying a noble metal as the oxidation catalyst has been under study, but it is very difficult to selectively oxidize a trace amount of CO present in a large amount of hydrogen completely.

A conventional process using a metal hydride film such as Pd film is optimal because it gives hydrogen of high purity applicable as the fuel for PEFC. However, the process is costly because it necessitates a very expensive Pd film. Another disadvantage is that the structure of the device is complicated because hydrogen is fundamentally obtained by a pressure difference.

On the other hand, the concentration of CO can not be sufficiently reduced to a level at which the resultant gas can be used as the fuel of PEFC, even if the CO conversion process is used.

To the contrary, the process of removing CO by oxidation may realize a device having a relatively simplified structure, thereby reducing the cost, compared with the cost required for the process of removing CO by using the hydrogen separating film. However, in the process using the noble metal carrying alumina catalyst which is under study at present, the temperature required for oxidizing CO is from 250° to 350° C. and the efficiency is low. Since hydrogen is simultaneously oxidized, the selectivity is poor. Moreover, this catalyst allows the presence of excess steam, which causes methanation, thereby causing a drastic decrease in the amount of hydrogen.

Therefore, in order to realize removal of CO by oxidation, it is demanded to develop a high performance catalyst for removing CO that selectively oxidizes a trace amount of CO present in a large amount of hydrogen at a low temperature.

SUMMARY OF THE INVENTION

The present invention provides a catalyst material for removing carbon monoxide which comprises an A type zeolite carrying at least one metal selected from the group consisting of Pt, Pd, Ru, Au, Rh and Ir, or an alloy of two or more metals.

The present invention provides a fuel cell device equipped with the above-mentioned catalyst material for removing carbon monoxide. This fuel cell device is equipped with a polymer electrolyte fuel cell, a gas reformer, a fuel gas feeding path for feeding a reformed gas to a fuel electrode of the fuel cell from the gas reformer and a feeding path for feeding an oxidant gas to a cathode of the fuel cell.

A process of removing carbon monoxide in a reformed gas fed to the fuel cell of the present invention comprises passing the reformed gas obtained by reforming a hydrocarbon material through the above-mentioned catalyst material for removing carbon monoxide at a temperature of the catalyst of 50° to 200° C.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF PREFERRED EMBODIMENTS

The catalyst material for removing carbon monoxide of the present invention is prepared from an A type zeolite as a carrier which carries at least one metal selected from the group consisting of Pt, Pd, Ru, Au, Rh and Ir, or an alloy of two or more metals.

In a preferable mode of the present invention, the cationic species constituting the A type zeolite comprises at least one metal selected from the group consisting of K, Na, Ca and Mg.

In the above-mentioned oxidation catalyst, a carrying amount of the metal such as Pt is preferably from 0.1 to 10% by weight.

Impregnation or ion exchange is preferable for having the metal such as Pt carried.

In the process of removing carbon monoxide of the present invention, an amount of oxygen introduced into the catalyst material for removing carbon monoxide, together with the reformed gas, is 0.5 to 2 times greater than the amount of carbon monoxide contained in the reformed gas.

According to the present invention, it is possible to remove CO by oxidation at a temperature lower than that used in a conventional technique. The use of an A type zeolite having a molecular sieve action helps selective oxidation of CO.

The A type zeolite is a sort of synthetic zeolite having a unit cell represented by the formula $Na_{12}[(AlO_2)_{12}(SiO_2)_{12}]\cdot 27H_2O$, wherein Na as a cation can be substituted with other metal cation. "A type zeolite" is a general term for all of them. In the following Examples, a zeolite having Na as the cation is referred to as "Na/A type zeolite" and those having K, Ca and Mg as the cation are referred to as "K/A type zeolite", "Ca/A type zeolite" and "Mg/A type zeolite", respectively.

Figure 1:
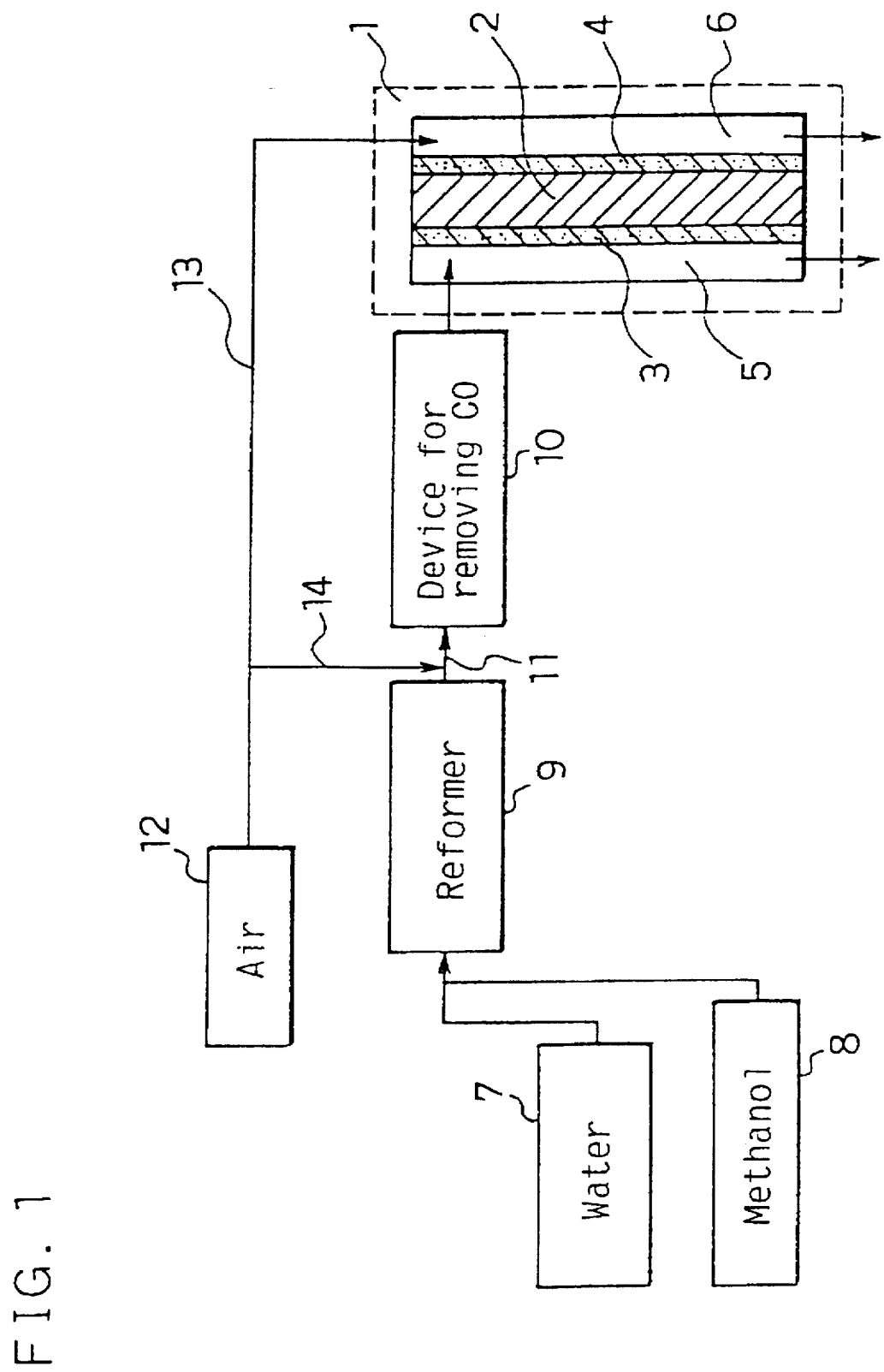
FIG. 1 is a diagram illustrating a schematic construction of a fuel cell device of the present invention.

A schematic construction of the fuel cell device of the present invention is shown in FIG. 1. A fuel cell 1 is a polymer electrolyte fuel cell comprising an anode 3 and a cathode 4, which are composed of a carbon electrode carrying a platinum catalyst, and a polymer electrolyte layer 2 of a polymer electrolyte film which is commercially available from Du Pont Co. under the trade name of Nafion 112, the polymer electrolyte layer being interposed between both electrodes. A hydrogen fuel is fed to an anode chamber 5 of the fuel cell from a reformer 9. Water and methanol are respectively fed to the reformer 9 from feeding sources 7 and 8, and methanol is steam-reformed in the reformer 9. Air is fed to a cathode chamber 6 of the fuel cell from a feeding source 12. The above-mentioned construction is the same as that of the known polymer electrolyte fuel cell. In the present invention, a device for removing carbon monoxide 10 is provided in a feeding path for fuel gas 11 between the reformer 9 and an anode chamber 5. Oxygen is fed to the device for removing carbon monoxide 10 from a path 14 which bifurcates from a feeding path for air 13 in a suitable amount required for oxidizing carbon monoxide in a hydrogen rich fuel fed from the reformer 9.

As described above, according to the present invention, it is possible to remove CO by oxidation at a temperature lower than that used in the conventional technique. Since the carrier is a zeolite having a molecular sieve action, CO can be selectively oxidized satisfactorily and a catalyst material for removing carbon monoxide having an excellent long-term reliability can be provided.

In the following, the present invention will be described in more detail with reference to embodying examples.

EXAMPLE 1

Firstly, an Na/A type zeolite carrying Pt was prepared by impregnation.

A predetermined amount of a nitric acid acidic solution of dinitrodiamineplatinum (Pt content: 4.5% by weight) was weighed and an Na/A type zeolite was added to the solution, followed by stirring. After adding distilled water in an amount two times greater than that of the zeolite and stirring for a few minutes, the mixture was calcined at 500° C. for one hour. Thus, an Na/A type zeolite carrying 3% by weight of Pt was obtained.

Then, another Na/A type zeolite carrying Pt was prepared by ion exchange. To an Na/A type zeolite, distilled water in an amount twenty times (weight ratio) greater than that of the zeolite was added and, after stirring at 97° C. for a few hours, a predetermined amount of an aqueous solution of tetraammineplatinum (II) chloride (0.01 mol/l) was added drop by drop. After continuous stirring at the same temperature for several hours, the mixture was allowed to stand at room temperature overnight. The resultant solution was filtered, washed with distilled water, dried at 80° C. for 20 hours and calcined at 300° C. for 4 hours. Thus, another Na/A type zeolite carrying 3% by weight of Pt was obtained.

Figure 2:
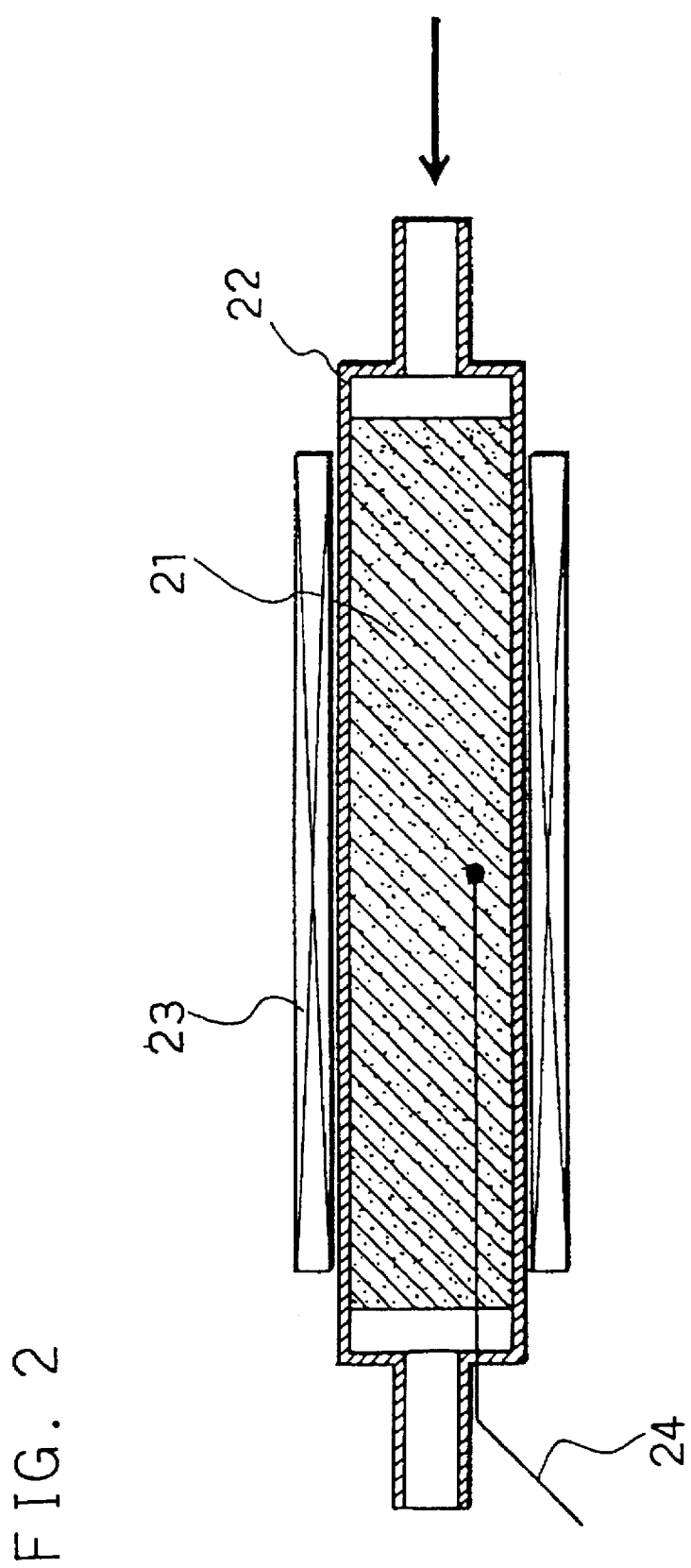
FIG. 2 is a longitudinal sectional view illustrating a construction of the device for removing carbon monoxide used in the Examples of the present invention.

FIG. 2 illustrates a construction of the device for removing carbon monoxide using the above-mentioned oxidation catalyst. The oxidation catalyst 21 is sifted into 10 to 20 mesh and packed in a pipe 22 made of a stainless steel. A heater 23 is provided outside the pipe 22 and a temperature is detected by a thermocouple 24 provided in the oxidation catalyst, whereby an operating temperature is adjusted.

A reformed gas (gas composition: CO 1%, $CO_2$ 24%, $H_2$ 75%) prepared by steam-reforming methanol, followed by CO conversion, and air was introduced into this device for removing carbon monoxide in a predetermined ratio. Space velocity SV was adjusted to 2000 $h^{-1}$. The gas composition in a treating gas after passing through the device for removing carbon monoxide was measured by gas chromatography.

Firstly, temperature dependency of the Pt carrying Na/A type zeolite catalyst prepared by each process was examined by setting the $O_2/CO$ ratio to be introduced at 2.

Figure 3:
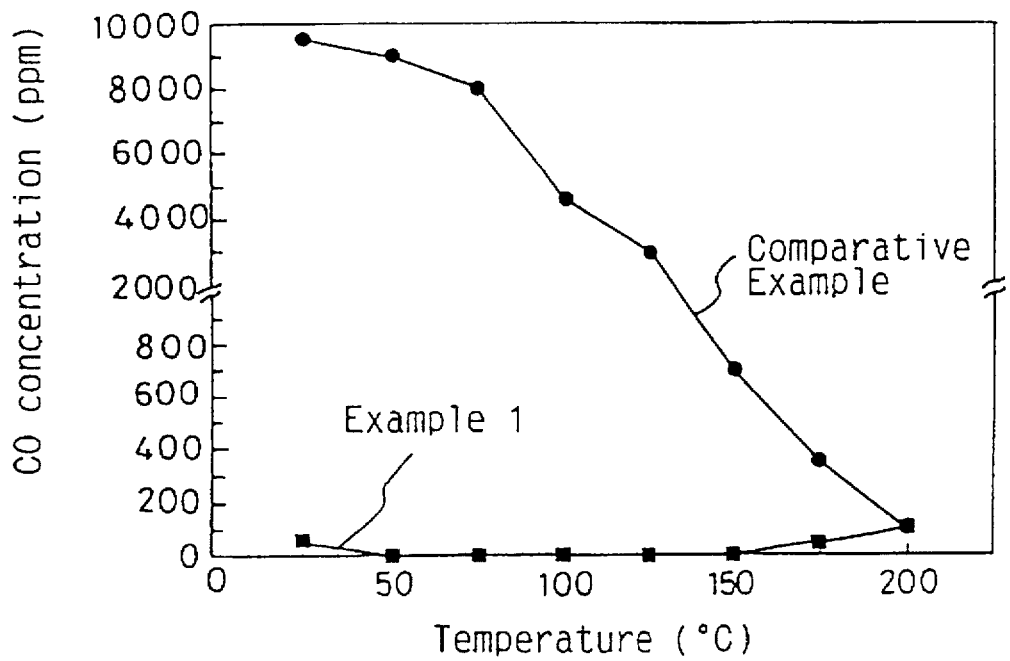
FIG. 3 is a graph illustrating a relation between the CO concentration and the operating temperature of the device for removing carbon monoxide using the oxidation catalyst of Example 1 of the present invention.

The resultant temperature dependency of the concentration of CO in the treating gas is shown in FIG. 3. Characteristics of a Pt carrying alumina catalyst prepared as a comparative example according to the same impregnation process except for using an alumina carrier in place of the Na/A type zeolite are also shown.

As is apparent from FIG. 3, CO is not detected within the range from 50° to 150° C. and CO is completely oxidized when the Pt carrying Na/A type zeolite is used. On the other hand, regarding the Pt carrying alumina catalyst, the CO concentration increases as the temperature becomes low and the CO oxidizing performance becomes lower in any temperature range, compared to the Pt carrying Na/A type zeolite. It is normally said that a temperature of not lower than 200° C. is required in the use of the alumina catalyst. Therefore, it is apparent that CO can be oxidized at a temperature lower than that used for the alumina catalyst, if the Pt carrying Na/A type zeolite is used as the catalyst.

A comparison was made for the concentration of CO in the treating gas at each temperature between the Pt carrying Na/A type zeolites prepared by impregnation and ion exchange. The results are shown in Table 1. As is apparent from Table 1, the catalyst prepared by ion exchange showed slightly better CO oxidizing performance than that prepared by impregnation. Both catalysts, however, had substantially the same performance.

A comparison was made for the concentration of CO in the treating gas at each temperature between the Pt carrying K/A type zeolite, the Pt carrying Ca/A type zeolite and the Pt carrying Mg/A type zeolite, which are respectively prepared according to the same impregnation process. The results are shown in Table 2. With the K/A type zeolite, the CO oxidizing performance was the same as that obtained from the Na/A type zeolite. With the Ca/A and Ma/A type zeolites, although slightly inferior, the CO oxidizing performance was good because CO was not detected within the temperature range of about 100° C.

TABLE 1

| | CO concentration (ppm) | |
|---|---|---|
| Temperature(°C.) | Impregnation process | Ion exchange process |
| 25 | 50 | 35 |
| 50 | 0 | 0 |
| 75 | 0 | 0 |
| 100 | 0 | 0 |
| 125 | 0 | 0 |
| 150 | 0 | 0 |
| 175 | 50 | 40 |
| 200 | 105 | 90 |

TABLE 2

| | CO concentration (ppm) | | | |
|---|---|---|---|---|
| Temperature(°C.) | K/A | Na/A | Ca/A | Mg/A |
| 25 | 30 | 50 | 300 | 400 |
| 50 | 0 | 0 | 125 | 165 |
| 75 | 0 | 0 | 0 | 0 |
| 100 | 0 | 0 | 0 | 0 |
| 125 | 0 | 0 | 0 | 0 |
| 150 | 0 | 0 | 100 | 120 |
| 175 | 35 | 50 | 450 | 500 |
| 200 | 90 | 105 | 885 | 900 |

Figure 4:
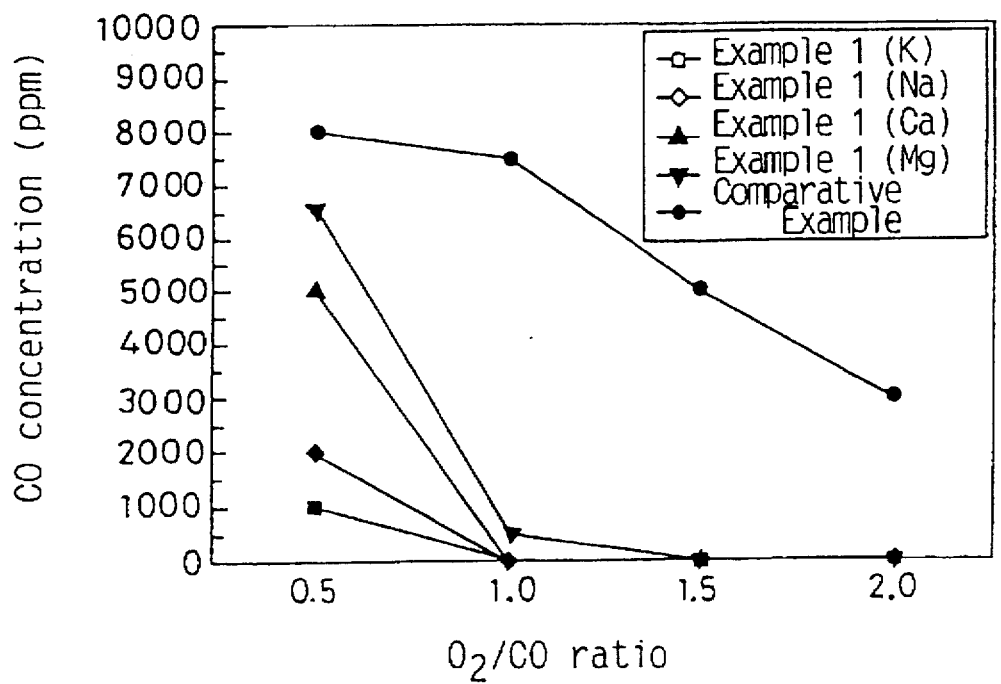
FIG. 4 is a graph illustrating a relation between the CO concentration and the $O_2/CO$ ratio of the device for removing carbon monoxide packed with various A type zeolite catalysts.

Then, the CO concentration was measured at a fixed oxidizing temperature of 125° C. by changing the ratio of $O_2$ to CO to be introduced. $O_2$/CO ratio dependencies of the CO concentration in the treating gas with various Pt carrying A type zeolites are shown in FIG. 4. Similar to FIG. 3, FIG. 4 also shows the CO oxidizing performance of the Pt carrying alumina catalyst of the Comparative Example. As is apparent from FIG. 4, with any A type zeolite, the CO concentration becomes smaller than that with the Pt carrying alumina catalyst and the CO oxidizing performance is excellent. When the $O_2$/CO ratio is within the range from 1.0 to 2.0, substantially no CO was detected in any case. The hydrogen concentration is 73.5% when the K/A type zeolite is used and the $O_2$/CO ratio is 0.5. As a result, it is found that almost all of $O_2$ introduced are used for selectively oxidizing CO. Therefore, the K/A type zeolite prepared by the impregnation process are used in the following Examples.

Figure 5:
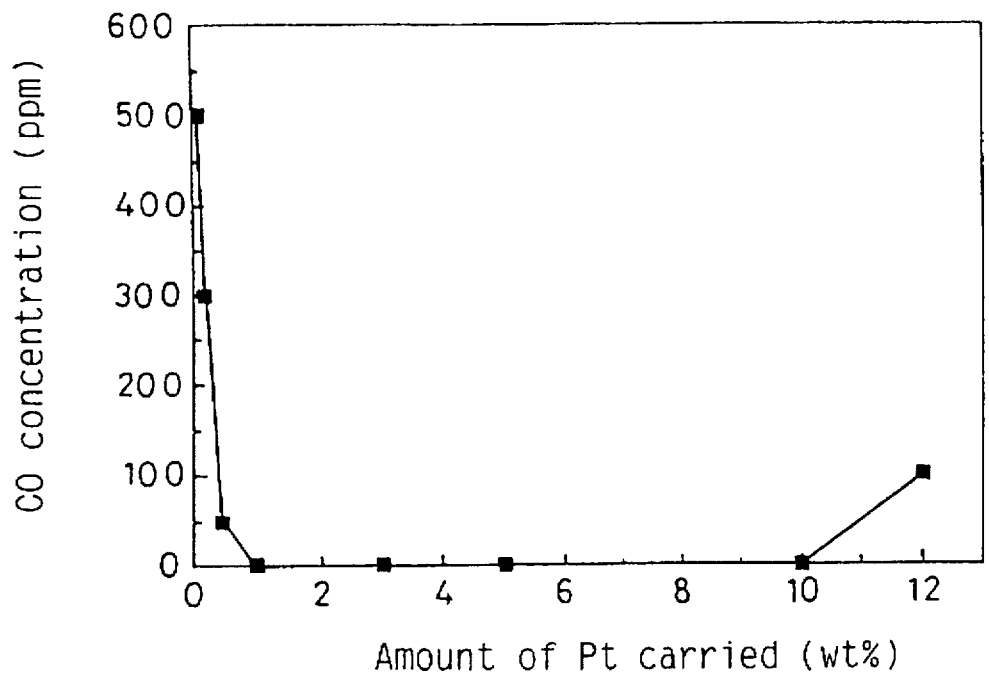
FIG. 5 is a graph illustrating a relation between the amount of Pt in a Pt carrying K/A type zeolite catalyst packed in the same device and the CO concentration.

Next, a relation between the carried amount of Pt and catalytic performance was examined. A few sorts of Pt carrying K/A type zeolites were prepared by changing the carried amount of Pt (including 3% by weight) were prepared and their characteristics were examined. FIG. 5 is a graph illustrating the characteristics of K/A type zeolites carrying various amounts of Pt obtained at a fixed oxidizing temperature and $O_2$/CO ratio of 100° C. and 2, respectively. As is apparent from FIG. 5, CO is not detected when the amount is within the range from 1 to 10% by weight.

Figure 6:
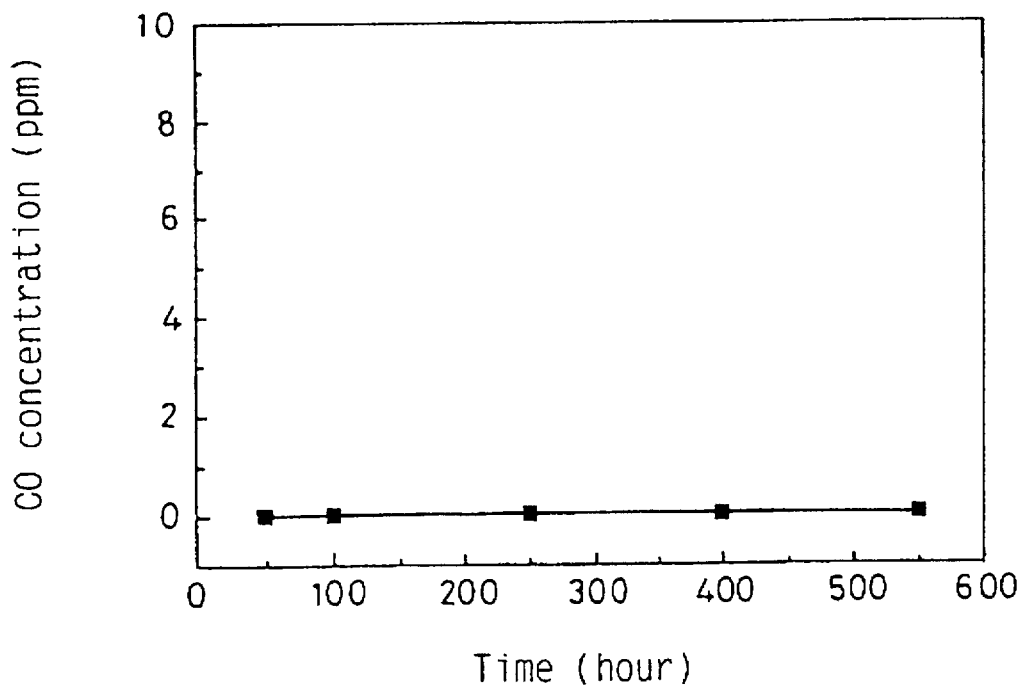
FIG. 6 is a graph illustrating sequential changes in CO concentration of the same device.

FIG. 6 is a graph illustrating the results of the life test on the 3 wt % Pt carrying K/A type zeolite obtained at the fixed oxidizing temperature of 100° C. and the fixed $O_2$/CO ratio of 2. As is apparent from FIG. 6, CO is not detected in the treating gas even after 1,000 hours and the device operates stably for a long period of time.

Next, the temperature dependency of each catalyst was examined by changing the metal to be carried and setting the ratio of $O_2$ to CO to be introduced at 2. The metal carried was Pd or Ru. Each catalyst was prepared according to the same impregnation according to the same manner as with Pt.

A comparison was made for the concentration of CO in the treating gas at each temperature between the K/A type zeolite catalysts carrying Pd or Ru and the catalyst carrying Pt. The results are shown in Table 3. As is apparent from Table 3, even when Pd or Ru is used, the performance is almost the same as that observed with Pt.

TABLE 3

| | Co concentration (ppm) | | |
|---|---|---|---|
| Temperature(°C.) | Pt | Pd | Ru |
| 25 | 30 | 50 | 25 |
| 50 | 0 | 30 | 0 |
| 75 | 0 | 0 | 0 |
| 100 | 0 | 0 | 0 |
| 125 | 0 | 0 | 0 |
| 150 | 0 | 20 | 0 |
| 175 | 35 | 50 | 30 |
| 200 | 90 | 120 | 80 |

As is apparent from the results, a catalyst for removing CO having long-term reliability can be obtained that can selectively remove CO by oxidation at a temperature lower than the conventionally applied temperature with the use of the Pt carrying A type zeolite as an oxidation catalyst. As the A type zeolite serving as the carrier, Na/A type zeolite, Ca/A type zeolite, Mg/A type zeolite, or other A type zeolites may also be used. As the metal to be carried, Pd and Ru can also be used, in addition to Pt. In the device equipped with the catalyst material, a stainless steel pipe was used in this Example, but any shape to which the present invention can be applied may be used.

EXAMPLE 2

In this Example, a (Pt+Pd) carrying Na/A type zeolite is used as the oxidation catalyst. This (Pt+Pd) carrying Na/A type zeolite was prepared by having dinitrodiamineplatinum and dinitrodiaminepalladium carried on an Na/A type zeolite according to the same impregnation process as that described in Example 1. An amount of Pt and Pd carried is 1% by weight, respectively. Characteristics of the zeolite thus prepared were examined by using a device for removing carbon monoxide having the same construction as that in Example 1. The measuring condition is the same as that in Example 1.

Figure 7:
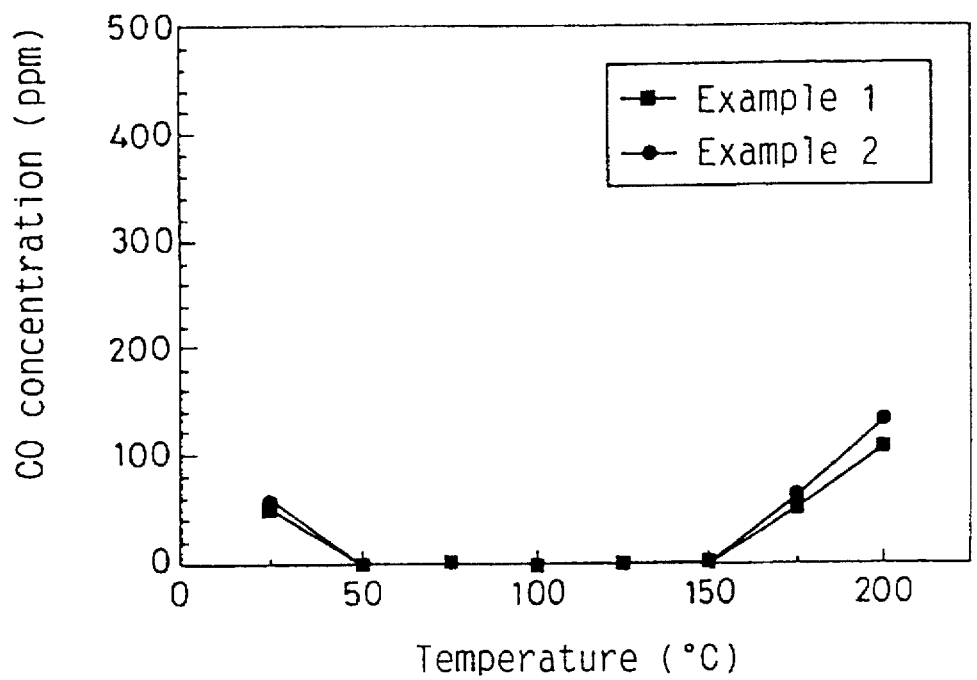
FIG. 7 is a graph illustrating a relation between the CO concentration and the operating temperature of the device for removing carbon monoxide using the oxidation catalyst of Example 2 of the present invention.

Firstly, temperature dependency of this oxidation catalyst was examined at a fixed ratio of $O_2$ to CO to be introduced of 2. A comparison was made for the temperature dependency of the concentration of CO in the treating gas between the (Pt+Pd) carrying Na/A type zeolite and the Pt carrying Na/A type zeolite. The results are shown in FIG. 7. As is apparent from FIG. 7, when the (Pt+Pd) carrying Na/A type zeolite is used, the performance is almost the same as that observed with the Pt carrying Na/A type zeolite.

Figure 8:
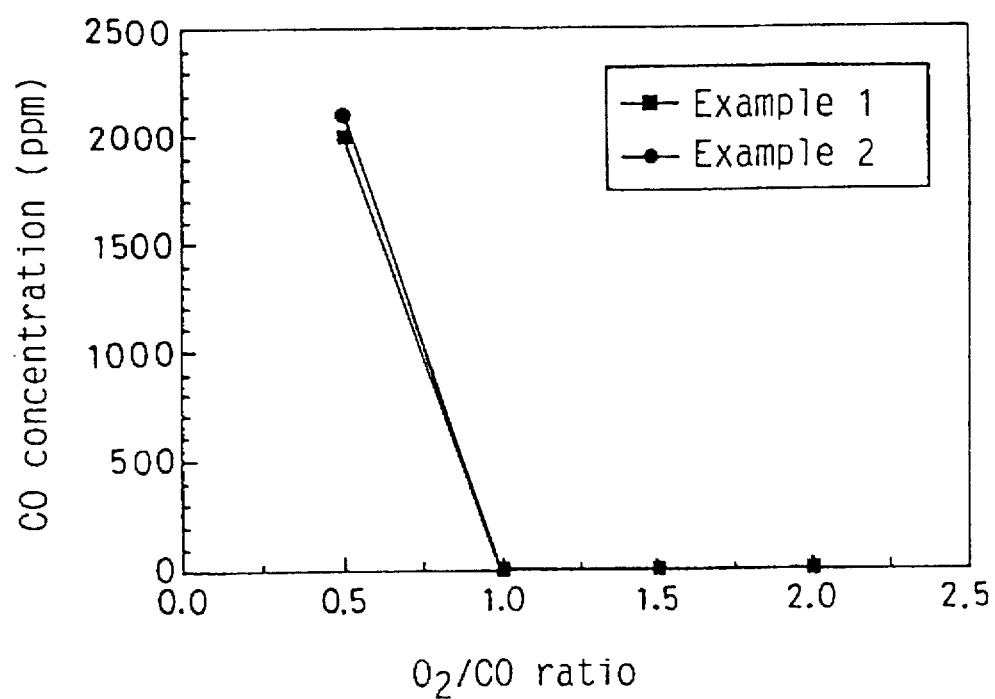
FIG. 8 is a graph illustrating a relation between the CO concentration and the $O_2/CO$ ratio of the same device.

Then, the CO concentration was measured at a fixed oxidizing temperature of 125° C. by changing the ratio of $O_2$ to CO to be introduced. A comparison was made for the $O_2$/CO ratio dependency of the concentration of CO in the treating gas between the (Pt+Pd) carrying Na/A type zeolite and the Pt carrying Na/A type zeolite, according to the same manner as described in FIG. 7. The results are shown in FIG. 8. As is apparent from FIG. 8, when the (Pt+Pd) carrying Na/A type zeolite is used, the performance is almost the same as that observed with the Pt carrying Na/A type zeolite.

A life test was carried out at a fixed oxidizing temperature and $O_2$/CO ratio of 100° C. and 2, respectively. As a result, CO was not detected in the treating gas even after 1,000 hours and the device operated stably for a long period of time, similar to the Pt carrying Na/A type zeolite.

As is apparent from the results, a catalyst material for removing carbon monoxide having long-term reliability can be obtained that can selectively remove CO within a wide temperature range, even if the (Pt+Pd) carrying A type zeolite is used as the oxidation catalyst. In this Example, a combination of (Pt+Pd) was used as the metal to be carried, but a combination of (Pt+Ru) or (Pd+Ru) can also be used.

EXAMPLE 3

In this Example, characteristics of removing CO by oxidation were examined by changing the $O_2$/CO ratio, SV value and metal to be carried on the A type zeolite. Firstly, temperature dependency of the 3 wt % Pt carrying Na/A type zeolite catalyst was examined at a fixed SV and fixed ratio of $O_2$ to CO to be introduced of 8000 h$^{-1}$ and 1.75, respectively. The preparing process and measuring condition of the zeolite catalyst are the same as those in Example 1.

Figure 9:
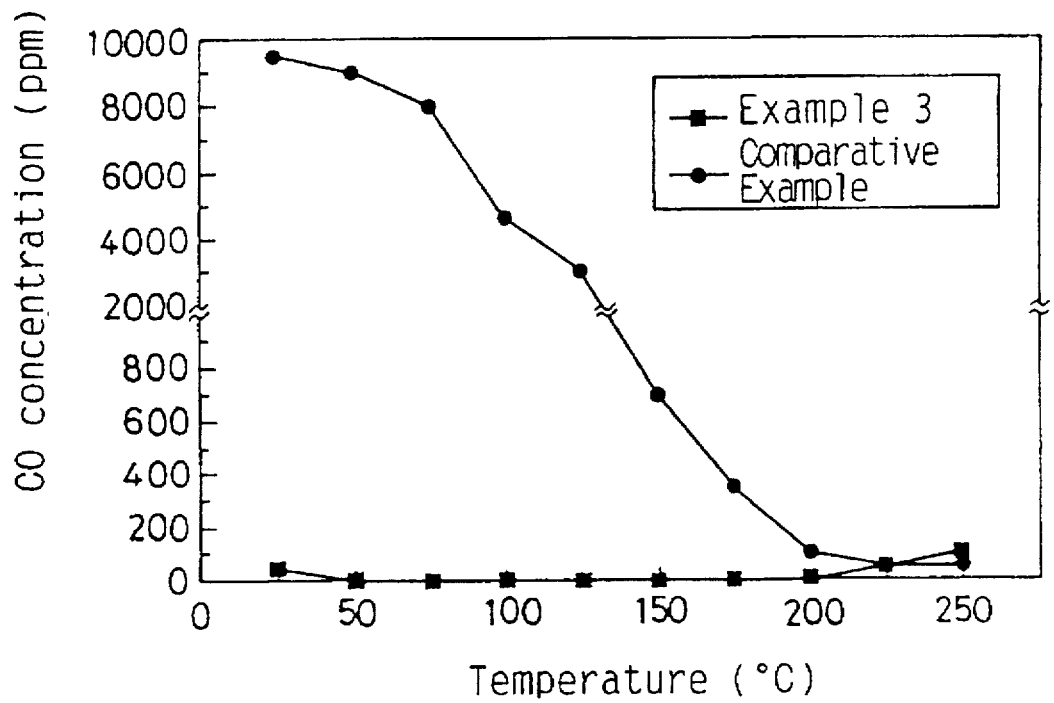
FIG. 9 is a graph illustrating a relation between the CO concentration and the operating temperature of the device for removing carbon monoxide using the oxidation catalyst of Example 3 of the present invention.

A comparison was made for the temperature dependency of the concentration of CO in the treating gas between the 3 wt % Pt carrying Na/A type zeolite and the Pt carrying alumina catalyst prepared by the impregnation process. The results are shown in FIG. 9. As is apparent from FIG. 9, with the Pt carrying Na/A type zeolite catalyst under this condition, the residual CO concentration is not more than 10 ppm within the temperature range from 50° to 200° C. and CO is oxidized almost completely. On the other hand, with the Pt carrying alumina catalyst, the CO concentration increases as the temperature becomes lower and the CO oxidizing performance becomes lower in any temperature range up to 225° C., compared with the Pt carrying Na/A type zeolite. It is normally said that the temperature of not lower than 200° C. is required in the use of the alumina catalyst. Therefore, it is apparent that CO can be oxidized at a temperature lower than that with the alumina catalyst, if the Pt carrying Na/A type zeolite is used as the catalyst.

A comparison was made for the concentration of CO in the treating gas at each temperature between the Pt carrying K/A type zeolite catalyst, the Pt carrying Ca/A type zeolite and the Pt carrying Mg/A type zeolite cstalysts, which are prepared according to the same impregnation process, and the above-mentioned Pt carrying Na/A type zeolite catalyst. The results are shown in Table 4.

TABLE 4

| Temperature(°C.) | CO concentration (ppm) | | | |
|---|---|---|---|---|
| | K/A | Na/A | Ca/A | Mg/A |
| 25 | 30 | 50 | 300 | 400 |
| 50 | 0 | 5 | 50 | 65 |
| 75 | 0 | 0 | 0 | 0 |
| 100 | 0 | 0 | 0 | 0 |
| 125 | 0 | 0 | 0 | 0 |
| 150 | 0 | 0 | 50 | 70 |
| 175 | 0 | 5 | 70 | 100 |
| 200 | 5 | 5 | 100 | 300 |
| 225 | 45 | 50 | 450 | 550 |
| 250 | 90 | 105 | 800 | 910 |

The K/A type zeolite catalyst has superior characteristics, compared to the Na/A type zeolite catalyst. The Ca/A and Mg/A type zeolite catalysts, on the other hand, have slightly poor characteristics, compared to the Na/K type zeolite. These catalysts, however, have excellent characteristics in the temperature range around 100° C. with no detection of CO. The characteristics of the K/A type zeolite showed substantially no change even if the $O_2$/CO ratio was reduced to 1.25 from 1.75. If the $O_2$/CO ratio was further reduced, the CO removing characteristic by oxidation of the K/A type zeolite was deteriorated at a low temperature of not higher than 100° C. but not deteriorated in the temperature range of higher than 100° C.

Figure 10:
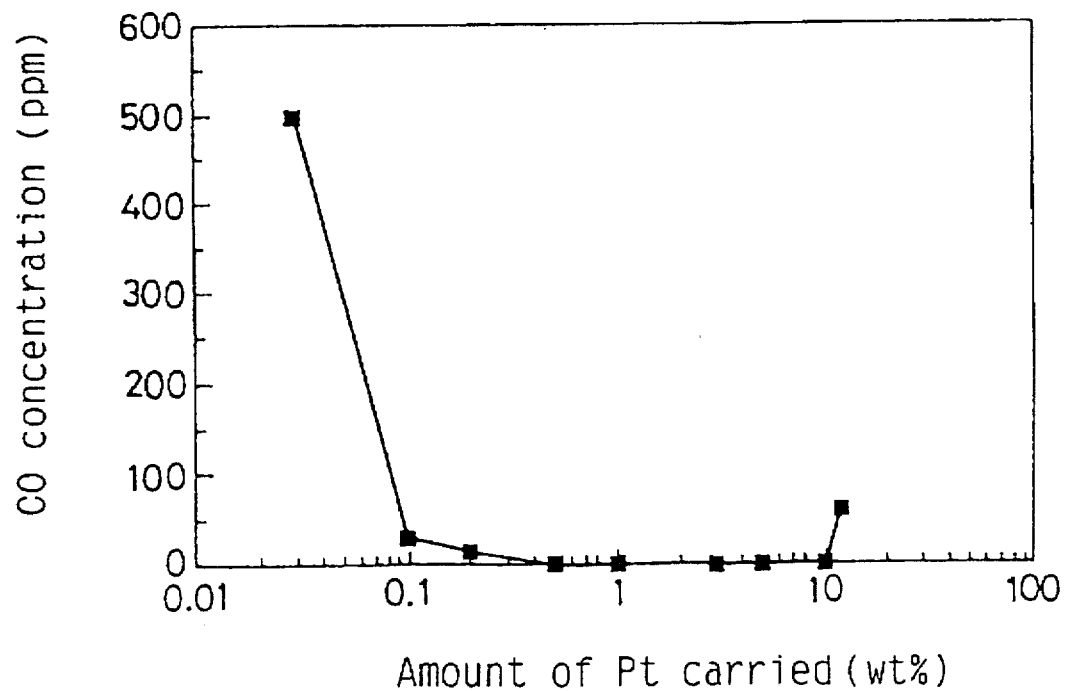
FIG. 10 is a graph illustrating a relation between the amount of Pt in a Pt carrying K/A type zeolite catalyst packed in the same device and the CO concentration.

Next, a relation between the carried amount of Pt and the catalytic performance was examined. A few sorts of Pt carrying K/A type zeolite catalysts prepared by changing the carried amount of Pt (including 3% by weight) were prepared according to the same manner as that described in Example 1, and their characteristics were examined. FIG. 10 is a graph illustrating characteristics of K/A type zeolites carrying various amounts of Pt, obtained at a fixed oxidizing temperature and $O_2$/CO ratio of 100° C. and 1.75, respectively. As is apparent from FIG. 10, CO is not detected when the amount is within the range from 1 to 10% by weight. At an $O_2$/CO ratio of 0.5, the CO removing performance by oxidation was deteriorated if the Pt carrying amount was below 1% by weight, but not deteriorated if the Pt carrying amount was 1% by weight or more.

Figure 11:
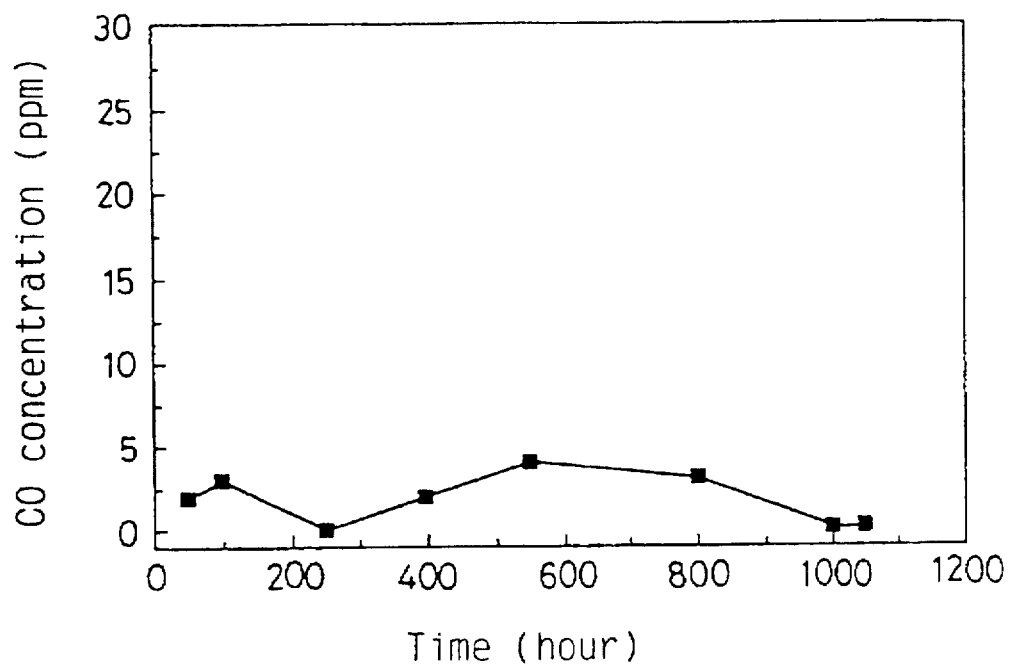
FIG. 11 is a graph illustrating sequential changes in CO concentration of the same device.

FIG. 11 is a graph illustrating the results of the life test of the 3 wt % Pt carrying K/A type zeolite obtained at a fixed oxidizing temperature and $O_2$/CO ratio of 100° C. and 1.75, respectively. As is apparent from FIG. 11, CO was not detected in the treating gas even after 1,000 hours and the device operated stably for a long period of time.

Next, temperature dependency of each catalyst was examined by changing the metal to be carried and setting the ratio of $O_2$ to CO to be introduced at 1.75. The metal carried was Au, Rh or Ir and each catalyst was prepared according to the same impregnation process as that with Pt.

A comparison was made for the concentration of CO in the treating gas at each temperature between the K/A type zeolite catalysts carrying Au, Rh or Ir and those carrying Pt, Pd or Ru of Example 1. The results are shown in Table 5. As is apparent from Table 5, even when Au, Rh or Ir is used, the performance is almost the same as that observed with Pt.

TABLE 5

| Temperature (°C.) | CO concentration (ppm) | | | | | |
|---|---|---|---|---|---|---|
| | Pt | Pd | Ru | Au | Rh | Ir |
| 25 | 30 | 50 | 25 | 55 | 40 | 60 |
| 50 | 0 | 25 | 0 | 0 | 5 | 10 |
| 75 | 0 | 0 | 0 | 0 | 0 | 0 |
| 100 | 0 | 0 | 0 | 0 | 0 | 0 |
| 125 | 0 | 0 | 0 | 0 | 0 | 0 |
| 150 | 0 | 20 | 0 | 0 | 0 | 10 |
| 175 | 0 | 50 | 0 | 5 | 5 | 20 |
| 200 | 5 | 90 | 5 | 15 | 10 | 50 |
| 225 | 45 | 155 | 40 | 35 | 60 | 135 |
| 250 | 90 | 200 | 80 | 70 | 100 | 185 |

As is apparent from the results, a catalyst material for removing carbon monoxide having long term reliability can be obtained that can selectively remove CO by oxidation at a temperature lower than that used in the conventional technique if the Pt carrying A type zeolite is used as the oxidation catalyst. As the A type zeolite serving as the carrier, the K/A type is preferably used. The Na/A type zeolite, Ca/A type zeolite, Mg/A type zeolite, and other A type zeolites may also be used. As the condition of removing CO by oxidation, the $O_2/CO$ ratio is preferably from 0.5 to 2.0, more preferably from 1.25 to 1.75. Any shape of the zeolite catalyst such as honeycomb and sphere may be used to which the present invention can be applied. As the metal to be carried, Au, Rh, Ir, etc. may be used. Among them, Pt, Ru, Au and Rh are preferably used.

EXAMPLE 4

In this Example, a Pt—Ru alloy carrying K/A type zeolite is used as the oxidation catalyst. This Pt—Ru alloy carrying K/A type zeolite was prepared according to the same impregnation process as that described in Example 1. The amount of Pt and Ru carried is 1% by weight, respectively. Characteristics of the zeolite thus prepared were examined by using a device for removing carbon monoxide having the same construction as that in Example 1. The measuring condition is the same as that in Example 1.

Figure 12:
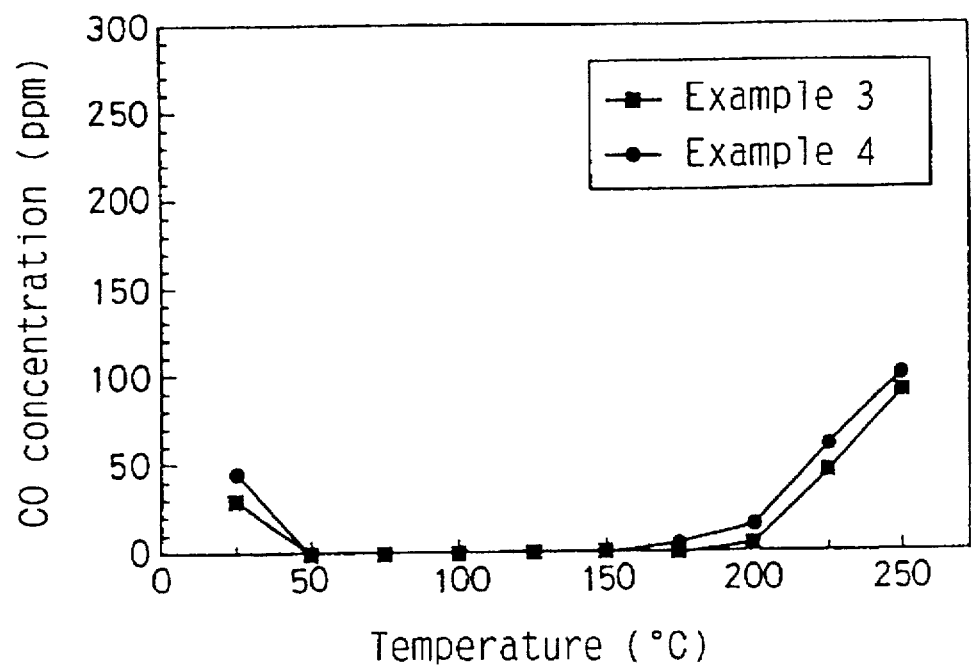
FIG. 12 is a graph illustrating a relation between the CO concentration and the operating temperature of the device for removing carbon monoxide using the oxidation catalyst of Example 4 of the present invention.

Firstly, temperature dependency of this oxidation catalyst was examined by setting the ratio of $O_2$ to CO to be introduced at 1.75. A comparison was made for the temperature dependency of the concentration of CO in the treating gas between the Pt'Ru alloy carrying K/A type zeolite and the Pt carrying K/A type zeolite used in Example 3. The results are shown in FIG. 12. As is apparent from FIG. 12, the Pt—Ru alloy carrying K/A type zeolite has substantially the same performance, compared to the Pt carrying K/A type zeolite.

Figure 13:
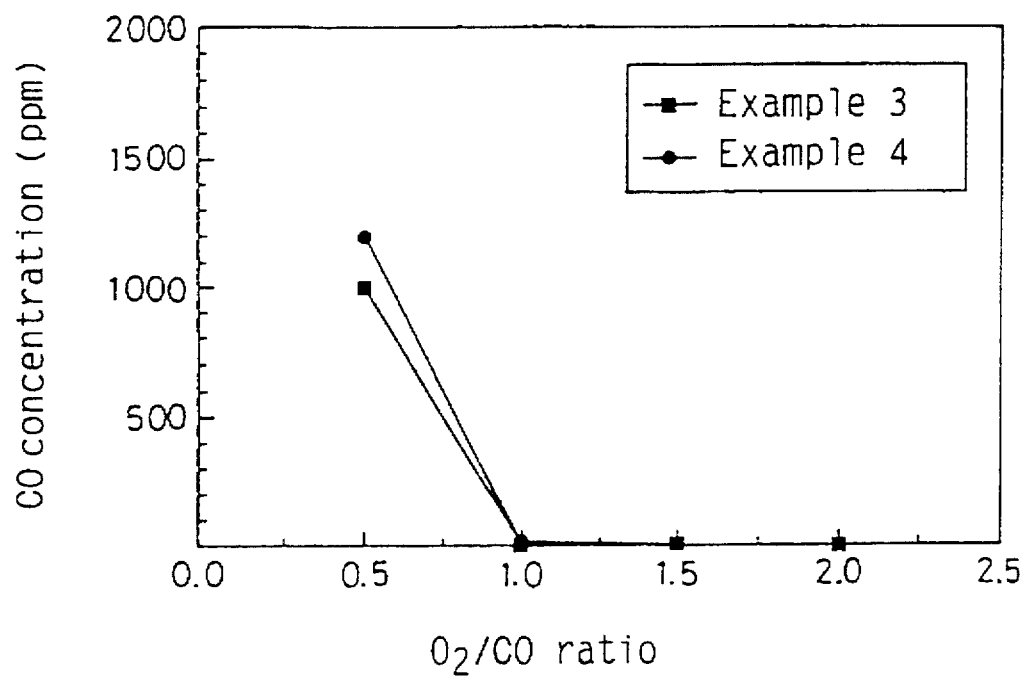
FIG. 13 is a graph illustrating a relation between the CO concentration and the $O_2/CO$ ratio of the same device.

Then, dependency of the ratio of $O_2$ to CO to be introduced was examined at a fixed oxidizing temperature of 125° C. A comparison was made on the dependency of the concentration of CO in the treating gas between the Pt—Ru alloy carrying K/A type zeolite and the Pt carrying K/A type zeolite used in Example 3. The results are shown in FIG. 13. As is apparent from FIG. 13, the Pt—Ru alloy carrying K/A type zeolite has substantially the same performance, compared to the Pt carrying K/A type zeolite.

A life test was carried out at a fixed oxidizing temperature and $O_2/CO$ ratio of 100° C. and 2, respectively. As a result, CO was not detected in the treating gas even after 1,000 hours and the device operated stably for a long period of time, similar to the Pt carrying K/A type zeolite.

Furthermore, K/A type zeolites carrying Pt—Au, Pt—Rh, Pt—Ir, Ru—Au, Ru—Rh and Au—Ir alloys were prepared, and their characteristics of removing CO by oxidation were examined. As a result, the performances were almost the same as that with the Pt—Ru alloy. Among them, those carrying the Pt—Au, Pt—Rh, Ru—Au and Ru—Rh alloys exhibited more excellent characteristics.

As is apparent from the results, a catalyst material for removing carbon monoxide having long term reliability can be obtained that can selectively remove CO within a wide temperature range, even if the K/A type zeolite carrying the alloy such as Pt—Ru alloy, etc. is used as the oxidation catalyst. In this Example, Pt—Ru, Pt—Au, Pt—Rh, Pt—Ir, Ru—Au, Ru—Rh and Ru—Ir alloys were used as the metal to be carried, but an alloy of other combination can also be used.

EXAMPLE 5

In this Example, A type zeolites having a different cation exchange amount were used as the oxidation catalyst. That is, 1% by weight of Pt was carried on A type zeolites prepared by ion-exchanging Na of a normal Na/A type zeolite with K in various proportions. Characteristics of the zeolites thus prepared were examined by using a device for removing carbon monoxide having the same construction as that in Example 1. The measuring condition is the same as that in Example 1.

Firstly, temperature dependency of these oxidation catalysts was examined by setting the ratio of $O_2$ to CO to be introduced at 1.75. A comparison was made for the temperature dependency of the concentration of CO in the treating gas at each temperature between the Pt carrying Na/A type zeolite catalysts having a different amount of ion-exchanged K ions. The results are shown in Table 6.

TABLE 6

| | CO concentration (ppm) | | | | | |
|---|---|---|---|---|---|---|
| | Amount of K ion exchanged | | | | | |
| Temperature (°C.) | 0 | 20 | 40 | 60 | 80 | 100 |
| 25 | 50 | 45 | 40 | 30 | 30 | 30 |
| 50 | 5 | 5 | 0 | 0 | 0 | 0 |
| 75 | 0 | 0 | 0 | 0 | 0 | 0 |
| 100 | 0 | 0 | 0 | 0 | 0 | 0 |
| 125 | 0 | 0 | 0 | 0 | 0 | 0 |
| 150 | 0 | 0 | 0 | 0 | 0 | 0 |
| 175 | 5 | 5 | 0 | 0 | 0 | 0 |
| 200 | 5 | 5 | 5 | 5 | 5 | 5 |
| 225 | 50 | 50 | 50 | 50 | 45 | 45 |
| 250 | 105 | 100 | 100 | 95 | 90 | 90 |

As is apparent from Table 6, the CO removal is slightly improved as the amount of exchanged K ions increases. When the amount exceeds 50%, the performance is almost the same as that observed with the K/A type zeolite catalyst.

Figure 14:
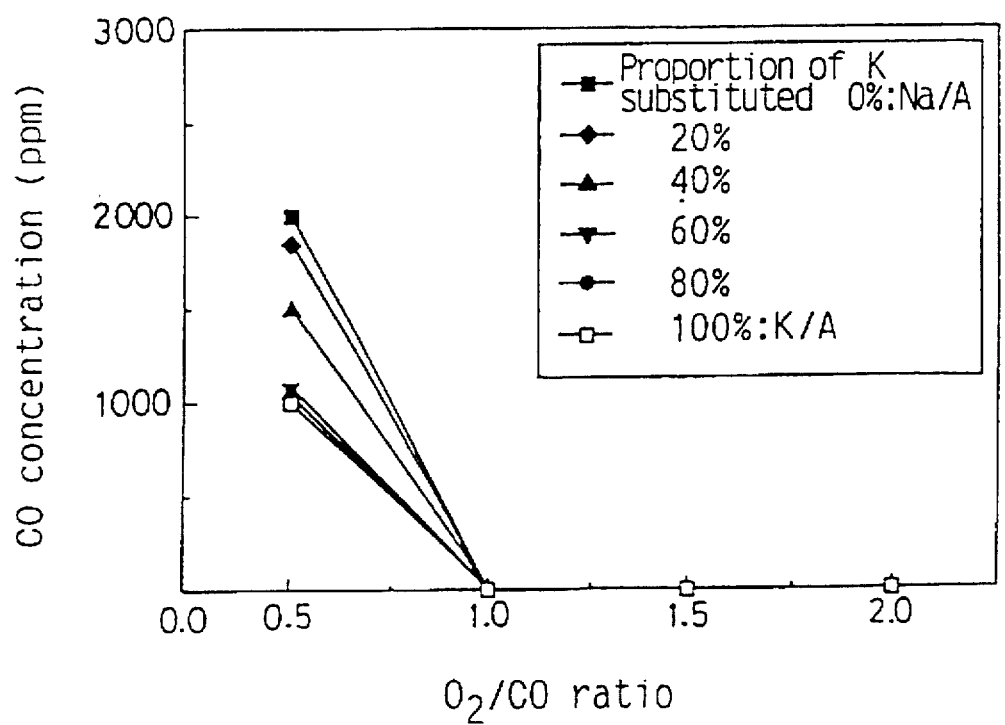
FIG. 14 is a graph illustrating a relation between the CO concentration and the $O_2/CO$ ratio of the device for removing carbon monoxide using the oxidation catalyst of Example 5 of the present invention.

Then, the CO concentration was measured at a constant oxidizing temperature of 125° C. by changing the ratio of $O_2$ to CO to be introduced. $O_2/CO$ ratio dependencies of the concentration of CO in the treating gas are shown in FIG. 14. As is apparent from FIG. characteristics ($O_2/CO$ ratio: 0.5) are improved by increasing the amount of exchanged K ions. When the amount exceeds 50%, the performance is almost the same as that observed with the K/A type zeolite catalyst. This fact shows that CO can be satisfactorily oxidized even if the catalyst is not completely exchanged with the K ion. As a result, it is found that a catalyst prepared by ion-exchanging a part of Na with K can be sufficiently used.

In this Example, the catalyst prepared by ion-exchanging a part of Na with K was examined. Other catalysts prepared by substituting a part of Na with Ca or Mg may also be used. The substituting amount of Na may be optional. Catalysts prepared by partially substituting Na with two or more metals selected from K, Ca and Mg may be used. In this Example, Pt was used as the metal to be carried but metals and alloys used in Examples 3 and 4 can also be used.

As Shown above, the oxidation catalysts in accordance with the present invention effectively oxidize and remove CO at a temperature lower than that used in the conventional technique. Since the carrier in accordance with the present invention is an A type zeolite that acts as a molecular sieve, CO is selectively oxidized efficiently, and thus they can give CO removing catalysts having long term reliability.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A fuel cell device comprising a polymer electrolyte fuel cell, a reformer, a fuel gas feeding path for feeding a reformed gas to a fuel electrode of said fuel cell from said reformer, a feeding path for feeding an oxidant gas to a cathode of said fuel cell and a device for removing carbon monoxide provided in said fuel gas feeding path, wherein said device for removing carbon monoxide is equipped with a catalyst material comprising an A type zeolite carrying at least one metal selected from the group consisting of Pt, Pd, Ru, Au, Rh and Ir, or an alloy of two or more metals.

2. A fuel cell device according to claim 1, wherein cationic species constituting said A type zeolite comprise at least one metal selected from the group consisting of K, Na, Ca and Mg.

3. A process for removing carbon monoxide in a reformed gas which is reformed from a hydrocarbon material and then fed to a fuel electrode of a fuel cell, comprising passing the reformed gas through a catalyst material for removing carbon monoxide at a temperature of said catalyst of 50° to 200° C., said catalyst comprising an A type zeolite carrying at least one metal selected from the group consisting of Pt, Pd, Ru, Au, Rh and Ir, or an alloy of two or more metals.

4. A process according to claim 3, wherein cationic species constituting said A type zeolite comprise at least one metal selected from the group consisting of K, Na, Ca and Mg.

5. The process for removing carbon monoxide in the reformed gas fed to the fuel cell in accordance with claim 3, wherein an amount of oxygen introduced into said catalyst material, together with the reformed gas, is 0.5 to 2 times greater than that of carbon monoxide in said reformed gas.

6. The process for removing carbon monoxide in the reformed gas fed to the fuel cell in accordance with claim 4, wherein an amount of oxygen introduced into said catalyst material, together with the reformed gas, is 0.5 to 2 times greater than that of carbon monoxide in said reformed gas.

* * * * *